US006663372B2

(12) United States Patent
Ready et al.

(10) Patent No.: US 6,663,372 B2
(45) Date of Patent: Dec. 16, 2003

(54) UNDERWATER PELLETIZER AND CUTTING SYSTEM THEREFOR

(75) Inventors: Kelly Ready, Delta (CA); Antonio Marchet, Burnaby (CA); Jonathan Reinheimer, Surrey (CA)

(73) Assignee: TDS Technologies Inc., Delta ( * ) Notice: Subject to any disclaimer, the term of this patent is extended or adjusted under 35 U.S.C. 154(b) by 268 days.

(21) Appl. No.: 09/832,971

(22) Filed: Apr. 12, 2001

(65) Prior Publication Data

US 2002/0150641 A1 Oct. 17, 2002

(51) Int. Cl.[7] ............................. B29C 47/08; B29B 9/02
(52) U.S. Cl. ..................... 425/67; 425/142; 425/168; 425/311; 425/DIG. 230
(58) Field of Search .................. 425/67, 142, 168, 425/311, 313, DIG. 230, 170; 264/142

(56) References Cited

U.S. PATENT DOCUMENTS

| 4,123,207 A | * 10/1978 | Dudley ...................... 425/67 |
| 4,529,370 A | * 7/1985 | Holmes et al. ............. 425/142 |
| 4,728,276 A | * 3/1988 | Pauley et al. ................ 425/67 |
| 5,330,340 A | * 7/1994 | Suppon et al. ............... 425/67 |
| 5,624,688 A | 4/1997 | Adams et al. ................ 425/67 |

FOREIGN PATENT DOCUMENTS

JP 11-179723 A * 6/1999

OTHER PUBLICATIONS

Gala Industries, Inc. brochure—No date.

* cited by examiner

Primary Examiner—Robert Davis
Assistant Examiner—Thu Khanh T. Nguyen
(74) Attorney, Agent, or Firm—Oyen Wiggs Green & Mutala

(57) ABSTRACT

An underwater pelletizer cutting system allowing fine adjustments of the relative spacial relationship between an extrusion die and the blades of a cutting assembly. The cutting assembly, which may be self-aligning in nature, is borne on the end of a drive shaft driven by a motor mounted on a carriage. The carriage is moveable relative a fixed frame by a servomotor driving a ball screw. The ball screw, which preferably has zero backlash, has a shaft attached at one end to the carriage for moving the carriage. A PLC control system may be provided to accept inputs from an operator and to run a cutting program, providing appropriate signals to the servomotor to advance the cutting assembly as needed as the blades of the cutting assembly wear. The PLC system may receive signals from a measuring system adapted to measure the contact pressure between the cutting assembly and the face of the extrusion die.

8 Claims, 7 Drawing Sheets

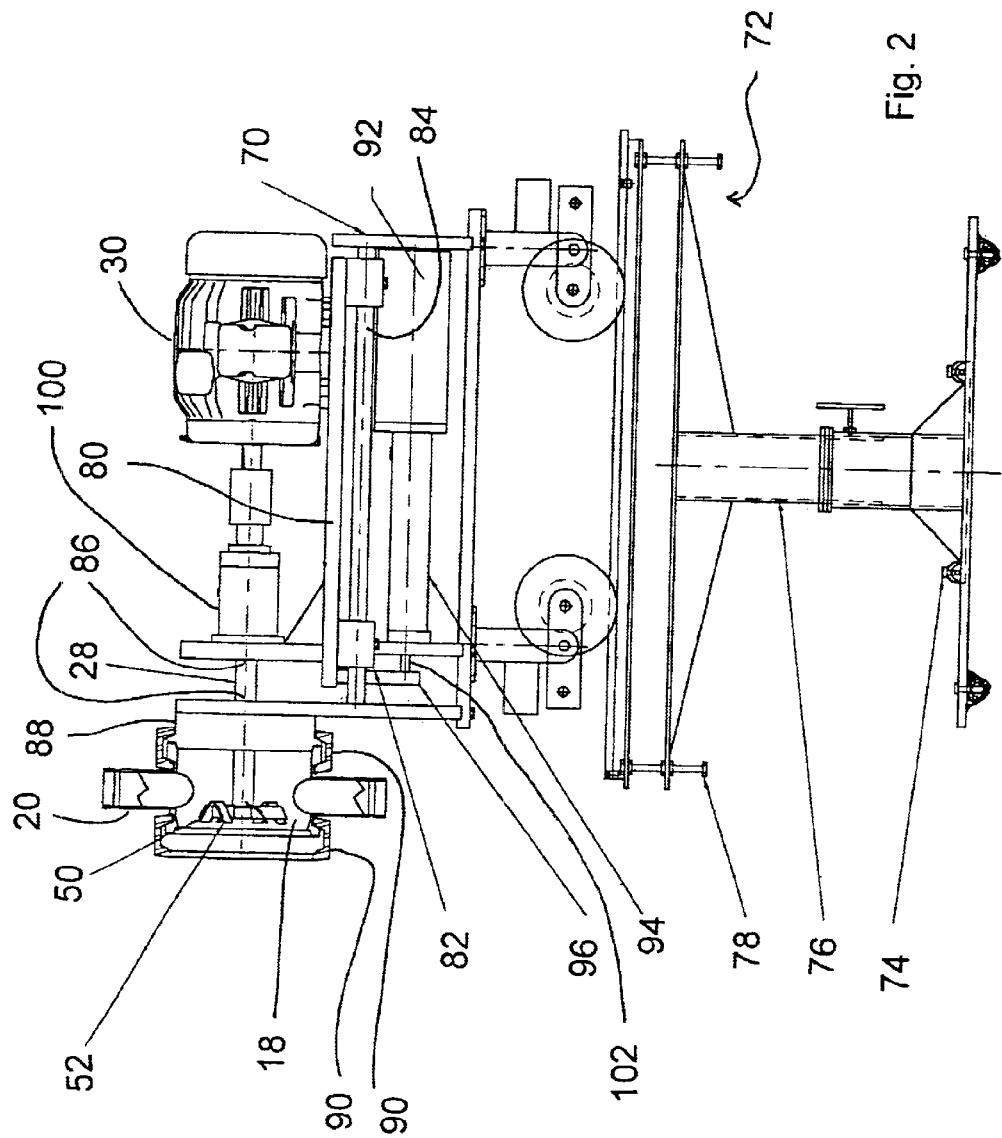

UNDERWATER PELLETIZER AND CUTTING SYSTEM THEREFOR

TECHNICAL FIELD

The present invention relates to underwater pelletizers and pelletizer cutting systems, and more particularly to underwater pelletizers having improved means for maintaining contact between a cutting assembly and the cutting face of an extrusion die.

BACKGROUND

Pelletizers have been known and used for a number of years. They are used to process rubber compounds, and molten thermoplastics and other polymers into pellets, which may in turn be used in other processes to manufacture various plastic materials.

In an underwater pelletizer, molten plastic is typically extruded by an extruder through orifices in a die coupled to the extruder, thereby tending to form continuous plastic strands. These strands are cut by a cutting system typically having a plurality of knives oriented against the die's "cutting face" to cut the strands as they emerge from the die. The cutting typically takes place under water in an enclosed water chamber or housing.

Plastic pellets are thereby formed which cool and harden in the water contained within the water chamber. Typically, the water in the water chamber is much cooler than the molten polymer, allowing quick cooling of the polymer and quick solidification of the pellets.

An underwater pelletizer is typically constructed so that a constant stream of water passes over the die's cutting face, conveying the hardened pellets along to equipment which separates out the pellets from the water and dries them.

It is very important that the pellets formed by such a pelletizing process be uniform in size and shape, and that they be made to a specific geometry. There are, however, a number of difficulties which may be encountered in trying to form such uniform pellets.

One of these difficulties relates to the clogging of extrusion orifices in the extrusion die. This difficulty has already been ameliorated by the present inventors, using a system described in U.S. Pat. No. 6,474,696, which is incorporated herein by reference.

Another one of these difficulties relates to the fact that the cutting knives in a typical underwater pelletizer, which are usually borne on a rotating cutting assembly, can "smear" the plastic emerging from the die if their blades are not optimally aligned with the cutting face of the die or if they are not urged against the die face with the optimal amount of force. This optimal amount of force, or "contact pressure", can vary depending upon a number of factors including the nature of the plastic being extruded, and its extrusion temperature and speed and the temperature of the water in the water chamber.

One reason it is difficult to maintain an optimal contact pressure on the cutting knives against the cutting face of the die is that the blades of the cutting knives wear. The die's cutting face may also wear. As this happens, a gap can form between the blades of the knives and the die's cutting face. Even a tiny gap can lead to undesirable smearing of the plastic. This is a well known problem with underwater pelletizers.

To overcome this particular problem, prior art systems have implemented somewhat rudimentary strategies for limiting the effects of the wearing of the knife blades. One strategy is to manually move the cutting assembly towards and against the die face whenever the blades have worn to the point where smearing begins to occur. This requires the pelletizer operator, once it is determined that smearing has begun, to mechanically adjust portions of the cutting system to force the cutting knives more closely against the cutting face of the die. This is done at the operators discretion.

This approach relies solely upon the operator's feel for the blade-to-die face contact pressure and is accordingly dependant upon the operator's level of experience and expertise, which is undesirable from the point of view of efficiency. Further, since the optimal contact pressure is not necessarily the same for all materials, the operator has to be well trained and experienced to be familiar with dealing with all possible materials.

Another known system provides spring-loaded cutting assemblies which tend to constantly urge the knife blades of the cutting assembly against the cutting face of the die. Springs having different spring rates are often provided to allow use of the system with different materials. However, this type of system does not allow for "fine-tuning" of the amount of contact pressure between the blades and the cutting face, which is very important.

For example, if a particular spring does not provide quite enough force, then the extrusion pressure can force the blades away from the cutting face, leading to smearing. If the spring provides too much force, then the blades wear too quickly. Further, a particular spring provides a force dependant upon how much it is compressed or stretched. As the cutting assembly is urged closer to the cutting face as the knife blades wear, the force provided by the spring changes, slightly, but potentially significantly. Accordingly, a spring, and even a set of different springs, cannot provide the fine tuning necessary for all extruded materials.

As noted earlier, "smearing" can also occur when the knife blades of the cutting assembly do not conform precisely to the plane of the cutting face of the extrusion die. This is typically caused by the misalignment of the shaft which rotates the cutting assembly. While self-aligning cutting assemblies, such as that shown in U.S. Pat. No. 5,624,688, which issued in 1997 to Adams et al., have been used in previous underwater pelletizers, they typically utilize a complicated and expensive ball-bearing system for maintaining the knife blades coplanar with the cutting face of the die.

An improved pelletizer continues to be needed, therefore, which allows for a more finely-tuned adjustment of the contact pressure between the knife blades and the cutting face of a die in an underwater pelletizer, and which also accomplishes, simply and inexpensively, the maintenance of a parallel, preferably co-planar relationship between the knife blade edges and the cutting face of the extrusion die.

SUMMARY OF INVENTION

The present invention is an underwater pelletizing system and more particularly an underwater pelletizing system having an improved a cutting system. In a preferred embodiment of the invention, the cutting system has a rotatable cutting assembly bearing a plurality of cutting knives; drive shaft attached to the cutting assembly for rotating it, the drive shaft driven by a drive motor; motorized cutting assembly adjustment means for adjustably moving the drive shaft axially toward and away from the cutting face of the die, thereby moving with it the cutting assembly along its rotational axis; a load measuring system associated with the motorized cutting assembly adjustment means to measure the contact pressure between the cutting assembly and the cutting face of the die; and a control system for coordinating communication between the load measuring system and the motorized cutting assembly adjustment means and for providing instructions to the motorized cutting assembly adjustment means to move the drive shaft toward and away from the cutting face of the die.

In a preferred embodiment of the invention, the system has a frame, and the drive motor is carried on a carriage mounted on and movable relative to the frame. The motorized cutting assembly adjustment means comprises a servomotor for reciprocating the carriage linearly relative to the frame. In one embodiment, the servomotor turns a ball screw having a shaft attached to the carriage for moving the carriage. The carriage may include a number of ball bearings which journal one or more shafts forming a portion of said frame.

The control system is preferably a programmable logic control system which allows pre-programmed cutting programs to be run.

One version of a useful cutting assembly has a center hub fashioned to be threaded onto an end of the drive shaft, and a blade-holding portion. An elastomeric disc is attached to both the center hub and the blade holder, bridging an annular gap between them.

BRIEF DESCRIPTION OF DRAWINGS

In the accompanying drawings which illustrate specific embodiments of the invention, but which should not be construed as restricting the spirit or scope of the invention in any way:

FIG. 2 is a detailed side view of the cutting system of the underwater pelletizing system illustrated in FIG. 1.

DESCRIPTION

Figure 1:
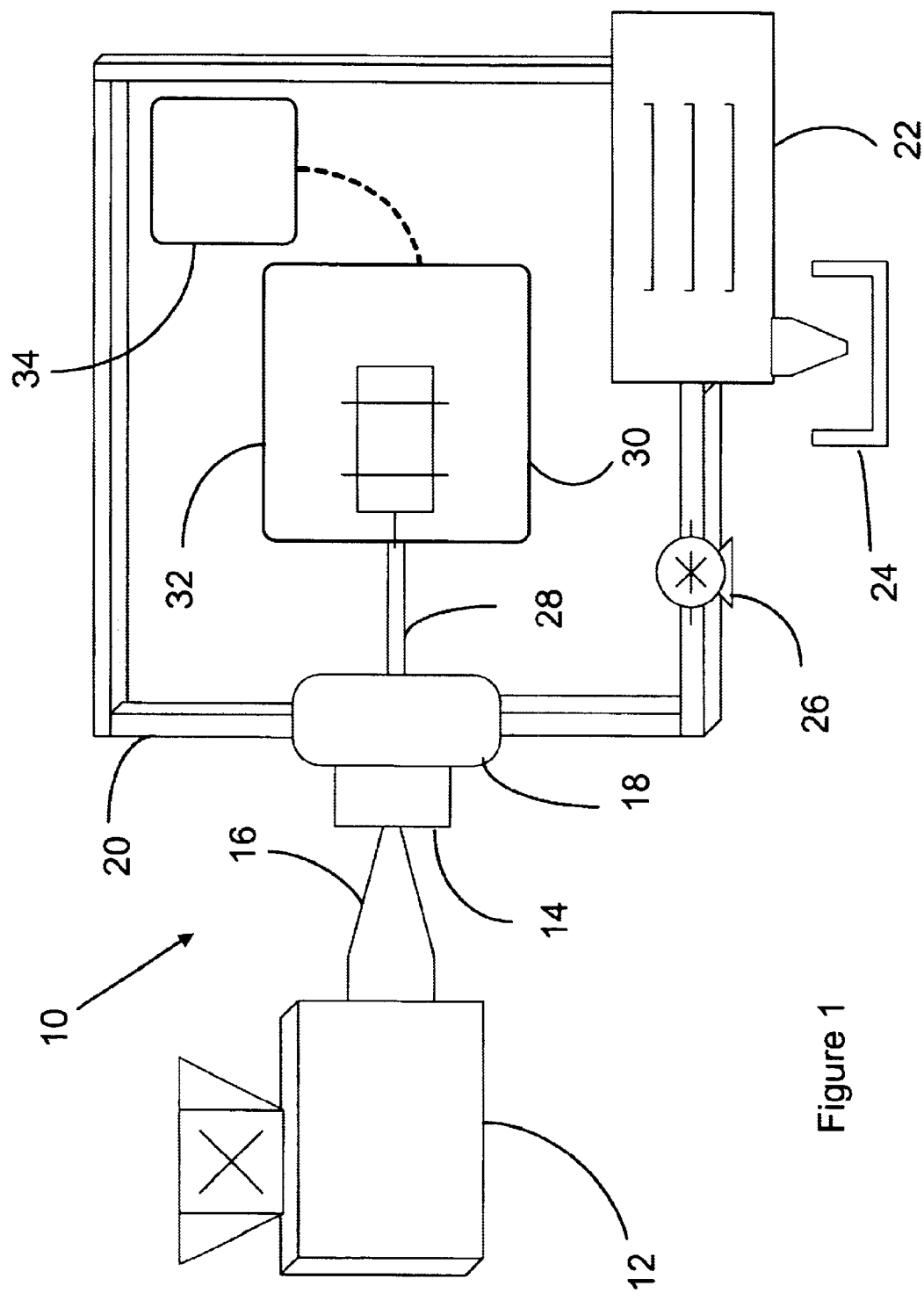
FIG. 1 is a block diagram of an underwater pelletizing system made in accordance with one embodiment of the present invention.

The underwater pelletizing system of the present invention, shown in FIG. 1 and denoted hereafter generally by the numeral 10, has an extruder 12 which extrudes a molten polymer into a water chamber 18 through an extrusion die 14 which is coupled to extruder 12 by means of one or more adaptors 16. Die 14 is also coupled to water chamber 18, either directly or with adaptors.

In water chamber 18, a cutting system cuts the strands of polymer passing through die 14, forming pellets which are conveyed by water running through conduit 20 into a dryer 22, where the pellets are separated out, dried and collected into a container 24. The water may be driven by a pump 26. This arrangement is all well known in the art, and has many familiar variations.

Figure 5:
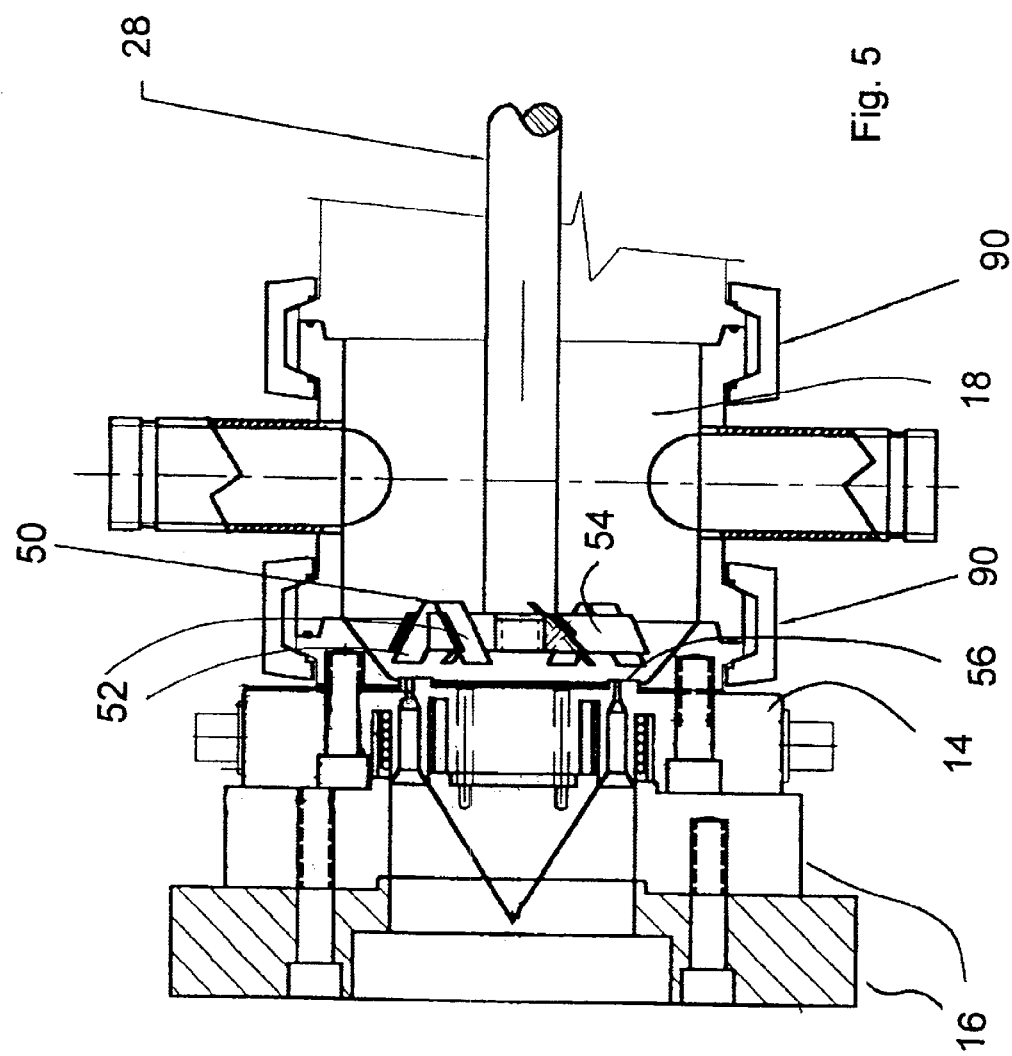
FIG. 5 is a broken away view of the cutting assembly portion of the cutting system shown in FIG. 2, occupying a portion of the water chamber and positioned near the cutting face of an extrusion die.

The new cutting system of the present invention has a drive motor 30 which drives a drive shaft 28 upon which is mounted, preferably at one end, a cutting assembly 50 (shown in the remainder of the Figures), which occupies a portion of water chamber 18 when the pelletizing system 10 is in operation, as most clearly shown in FIG. 5.

As an important aspect of the present invention, the cutting system further provides motorized means 32 for adjusting cutting assembly 50 relative to the cutting face 56 of die 14. Motorized means 32 are controlled by a control system 34, which is described in further detail below.

Figure 3A:
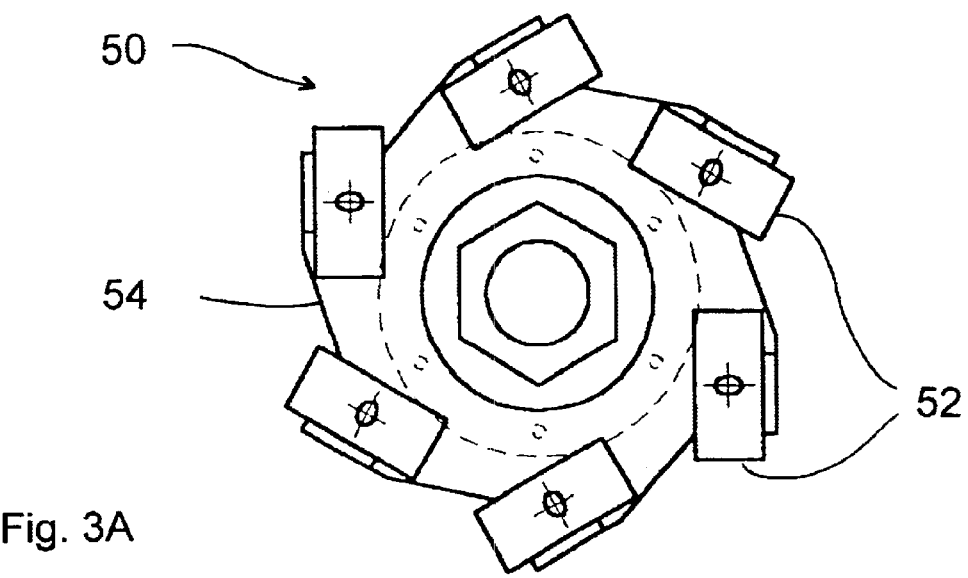
FIGS. 3A and 3B are end views of different types of cutting assemblies employable in the cutting system illustrated in FIG. 2.
Figure 3B:
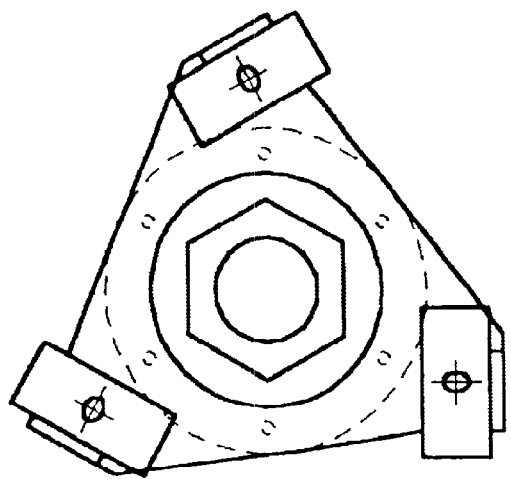

As shown in greater detail in FIG. 3A, cutting assembly 50 bears a plurality of knives, or more particularly knife blades 52, which protrude from the surface of a blade holder 54 to face and bear upon the cutting face 56 of die 14 when cutting assembly 50 is in use. Blades 52 may be reversible, having sharpened cutting edges at both ends, to double their useful life. FIG. 3B shows an alternative cutting assembly used in the art. Other similar cutting assemblies, including those known in the art as "rigid", "flexible" and "self-aligning" cutters, will be familiar to those in the pelletizing art, and may be suitably employed in the practise of the invention.

Cutting assembly 50 is attached at its rear to drive shaft 28 (FIG. 5) which is rotated by drive motor 30. As cutting assembly 50 is rotated, knife blades 52 cut strands of polymer (not shown) emerging from the cutting face 56 of die 14 into pellets. This general arrangement will also be familiar to those skilled in the art, but an improved assembly 50 is contemplated by the inventors. The improved assembly 50 is shown in greater detail in FIGS. 4 and 7.

Figure 4:
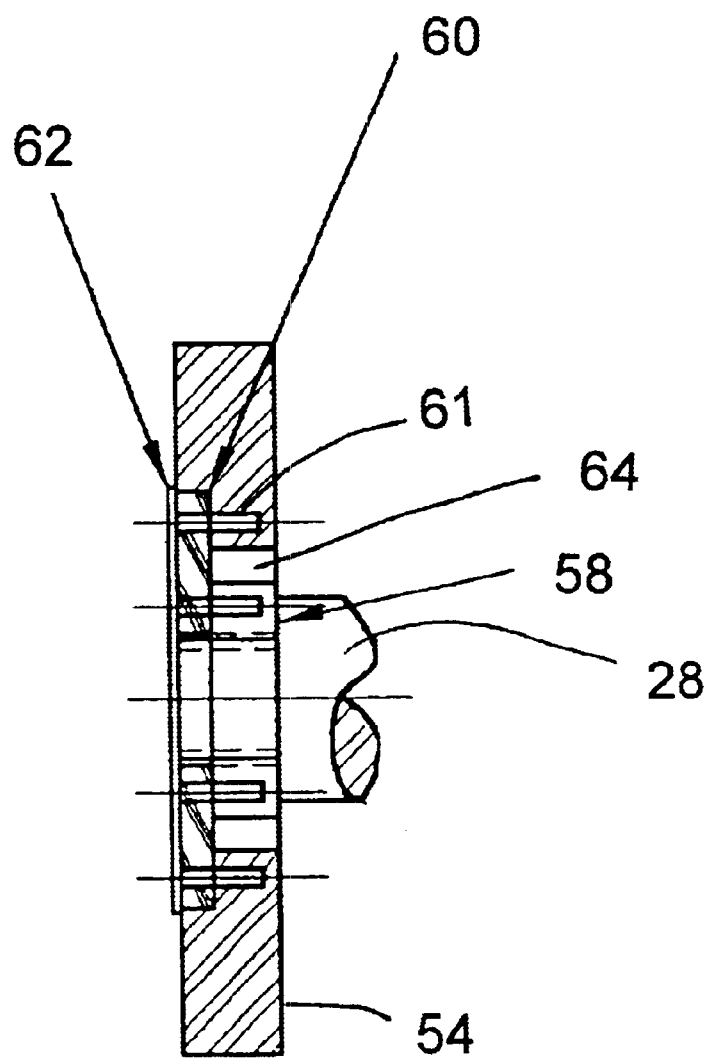
FIG. 4 is a cross-sectional side view of the cutting assembly illustrated in FIG. 3A, without knives attached.
Figure 7:
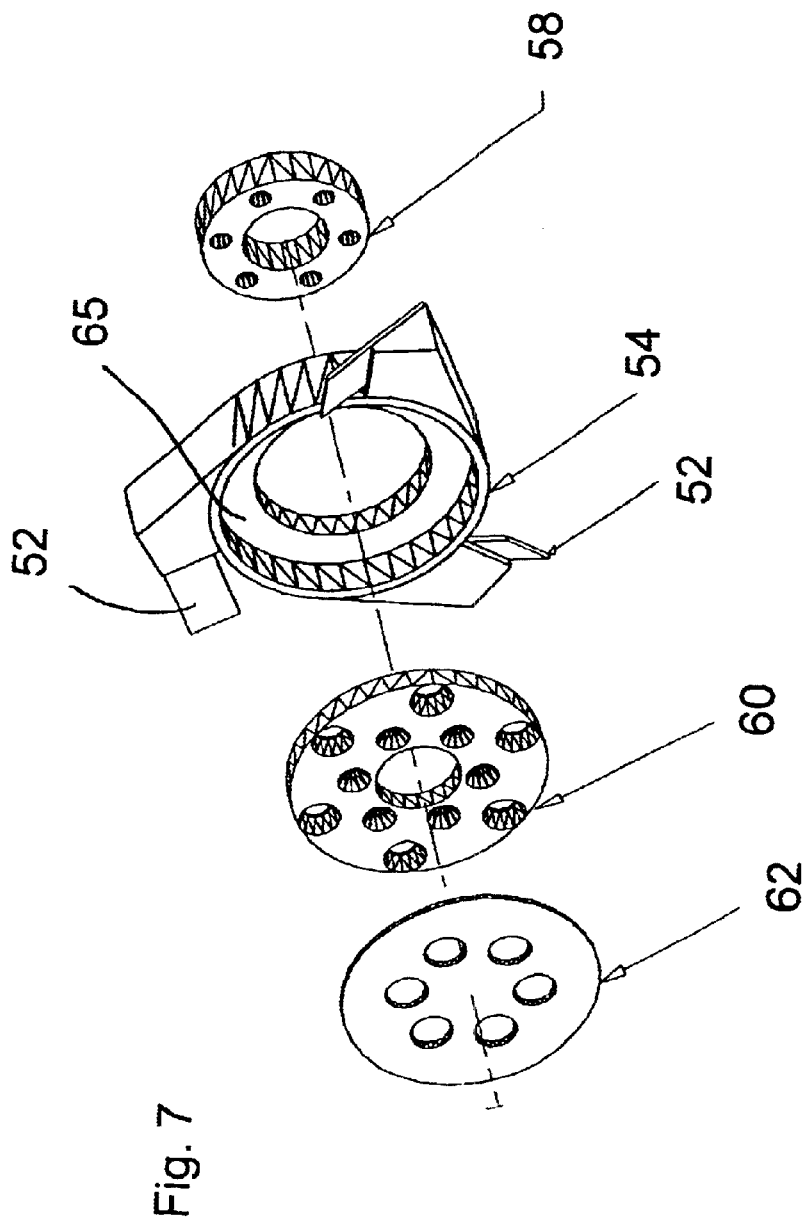
FIG. 7 is an exploded view of the cutting assembly shown in FIG. 3B.

As shown in FIG. 7, assembly 50 may be made up of a combination of elements including a center hub 58 which is fashioned to be threaded onto the threaded end of drive shaft 28. An elastomeric disc 60 is attached to center hub 58, conveniently by bolts 61 (FIG. 4). Elastomeric disc 60 is also attached to blade holder 54, and bridges an annular gap 64 between hub 58 and holder 54. Elastomeric disc 60 may be contained within a suitable recess 65 formed in one face of blade holder 54, and may be sandwiched between blade holder 54 and a cap 62. The assembled cutting assembly 50 is illustrated in FIG. 4.

It should be appreciated from this description and the drawings that if elastomeric disc 60 is made of the correct material, the proper characteristics of which will be able to be determined by those skilled in the art, it will transmit torque from center hub 58 to blade holder 54 when hub 58 is turned by the rotation of drive shaft 28, thereby causing blade holder 54 to turn at the same rpm as the hub 58.

Quite importantly, however, this arrangement also permits the proper cutting alignment of blade holder 54 even when the rotational axis of drive shaft 28 is not quite coaxial with the rotational axis of blade holder 54 (ie. when the drive shaft is not perfectly aligned). Again, this allows the cutting assembly to stay in a coplanar or parallel relationship with the die (the edges of each of blades 52 keep in continuous contact with cutting face 56 of die 14) even if the drive shaft is not precisely perpendicular to the die cutting face.

FIG. 2 illustrates the cutting system of the present invention in greater detail, with the water chamber portion of the pelletizer shown in a cutaway view to show cutting assembly 50 occupying a portion thereof.

As shown in FIG. 2, the cutting system of the present invention is provided with a frame 70 which may conveniently sit upon a base 72 having a variety of typical adjustment features 74, 76, 78 to allow proper macro adjustment of the position of the cutting system. A carriage 80 is mounted onto frame 70, and carries thereupon drive motor 30 which is fixedly mounted onto carriage 80. Carriage 80 is movable relative frame 70. In the preferred embodiment illustrated in FIG. 2, carriage 80 includes a number of ball bearings which journal one or more shafts 84 which form a portion of frame 70, thus allowing carriage 80 to reciprocate linearly from the rear of frame 70 towards the front thereof (from right to left in FIG. 2).

As discussed earlier, drive motor 30 drives a drive shaft 28. Drive shaft 28 may pass through a number of seals 86 mounted on both the carriage 80 and the frame 70. An adaptor 88 may be used to couple frame 70 to water chamber 18. Drive shaft 28 may also pass through one or more bearings 100 to keep it aligned.

In a preferred embodiment, quick-disconnect clamps 90 clamp both the extruder and the cutting system to water chamber 18. This allows for easy access to die 14 and enables the efficient purging of the die, for example on start-up of the pelletizing system. It also allows this combination of elements to be disassembled easily for cleaning.

The cutting system is further provided with motorized means for moving carriage 80 linearly along frame 70. Although it is contemplated that this means for moving carriage 80 can take many forms, in the illustrated preferred embodiment such means comprises a carriage-positioning servomotor 92 whose body may be attached to frame 70. Servomotor 92 drives a ball screw 94 which has a shaft 102 whose end is attached to a portion of carriage 80, such as flange or clevis 96. When ball screw 94 is turned by servomotor 92, carriage 80 is pushed or pulled relative frame 70. A "stepper motor" can be employed in place of servomotor 92 to keep costs of the system down, but servomotor 92 is preferred.

This arrangement allows carriage 80, and hence drive motor 30, drive shaft 28 and cutting assembly 50, to be moved linearly with respect to frame 70 by the operation of carriage positioning servomotor 92. With water chamber 18 coupled to frame 70, cutting assembly 50 can be moved towards and away from the cutting face 56 of die 14, when die 14 is also coupled to water chamber 18. It will be appreciated that suitable seals and grease nipples may be provided anywhere in the system if deemed necessary.

The range of motion of carriage 80 can be significant, depending upon the particular mechanical connection between frame 70 and carriage 80. Preferably, the range of motion of carriage 80 with respect to frame 70 allows cutting assembly 50 to be withdrawn from the cutting face of die 14 by up to at least an inch or two when the system is coupled to water chamber 18, although the most typical useful limit of movement will be approximately 0.5 inches. Apart from allowing cutting assembly 50 to be temporarily removed from the cutting face 56 of die 14, as discussed below, this range of movement allows the use of cutting assemblies of different dimensions.

Most importantly, the ball screw arrangement also allows the fine adjustment of the relative linear position of cutting assembly 50. In a preferred embodiment, the combination of servomotor 92 and ball screw 94 provides incremental linear advances of 0.001". Preferably, ball screw 94 has zero backlash.

It will be appreciated, then, that the contact pressure between cutting assembly 50 and die cutting face 56, as described earlier, can be adjusted by operating servomotor 92.

In operation, the cutting system is first roughly adjusted into position near water chamber 18 by means of adjustment features 74, 76, 78, and the cutting system may then be coupled to water chamber 18. The cutting assembly 50 is first placed into a position withdrawn from die 14 to allow die 14 to be purged. Cutting assembly 50 is then advanced towards die 14 until an appropriate contact pressure is reached between cutting assembly 50 and die cutting face 56. Again, if a self-aligning cutter such as cutting assembly 50 is used, the shaft 28 of the cutting system does not necessarily need to be exactly perpendicular to the cutting face 56, given the action of elastomeric disc 60 described above, to provide a parallel or coplanar connection between the edges of blades 52 of cutting assembly 50 and the cutting face 56 of die 14.

Figure 6:
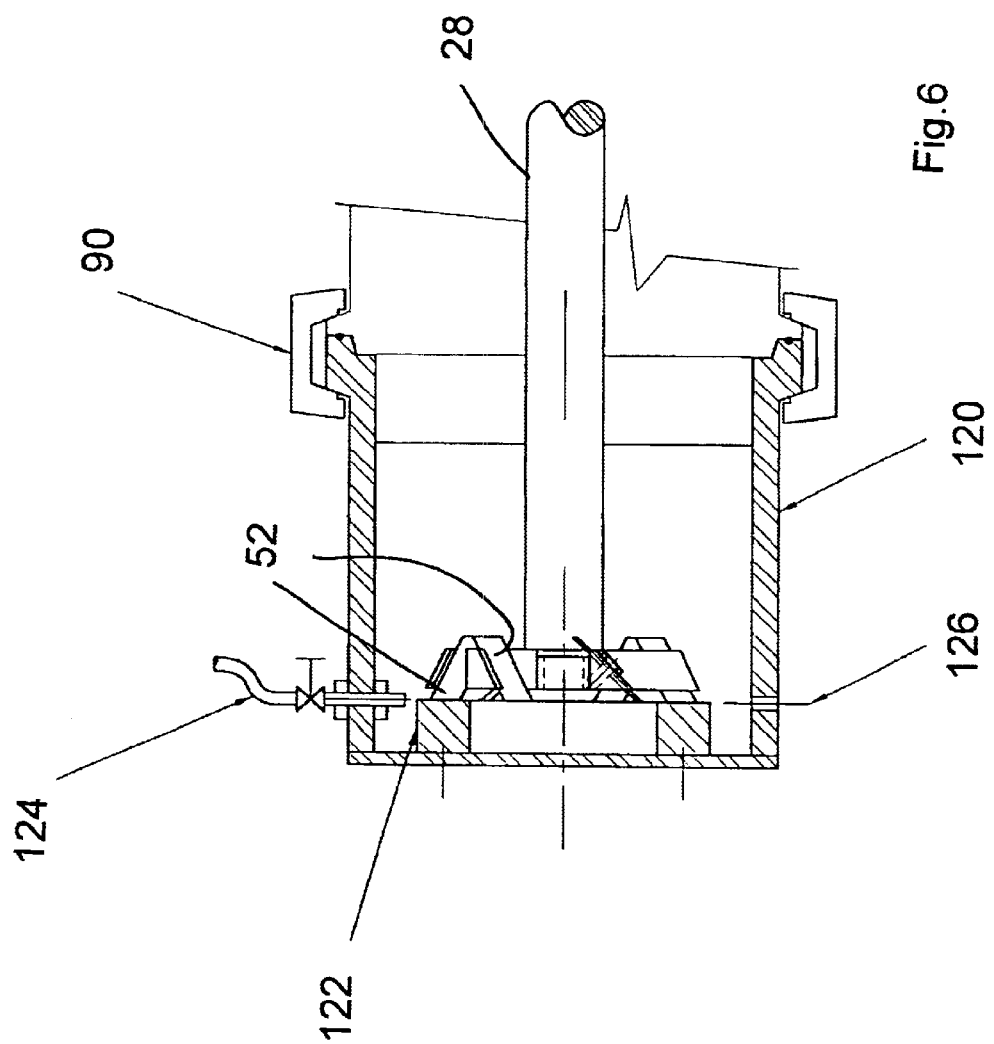
FIG. 6 is a cross-sectional view of a honing assembly for use with the cutting assembly of FIG. 4.

It has been recognized that the edges of blades 52 themselves, when first attached to the blade holder 54, are difficult to align in the same cutting plane. Misalignment leads to excessive wear of the die face and of the blades, and poor cuts by some blades, until all of the blades wear into the same plane. This initial wearing process can be accelerated by sharpening all the blades on the cutting assembly until an optimal alignment is achieved. Accordingly, the present system may also provide a honing disc assembly 120, shown in FIG. 6, which may be clamped to the cutting system by a quick-disconnect clamp 90. Honing disc assembly 120 may comprise a sharpening disc 122, means 124 for adding cutting fluid to the honing disc, and associated means 126 for removing the cutting fluid. In this manner, the blades 52 of cutting assembly 50 can be honed so that their edges are co-planar, before the cutting assembly is put into use.

The contact pressure between cutting assembly 50 and die cutting face 56 may be monitored by any suitable means but it is contemplated in the present invention that the drive motor 30 has associated with it a load-measuring module which measures the load being placed on the motor. Alternatively, a load sensor may be associated with servomotor 92; in operation, when a certain load is met, servomotor stops turning ball screw 94 until the load lessens by a predetermined amount. Or, a load sensor 98 may be associated with carriage 80 to monitor the load on the carriage, and hence, on the cutting assembly 50. What is critical to the invention is that the contact pressure be monitored by a load-measuring system, and that a feedback system be provided to lessen the force if it is too great, or to increase it if it is too little.

The load monitoring system of the invention, whatever its particular configuration, preferably provides information signals to a control system 34 (FIG. 1), which may be remote from the cutting system itself. Control system 34 also provides information signals to servomotor 92 dependant upon the signal it receives from the load monitoring system. Control system 34 preferably incorporates microprocessors and a software program to allow control system 34 to monitor and provide signals electronically. In the preferred embodiment, a programmable logic control ("PLC") system provides the system the most flexibility. Providing a computerized control system 34 allows the system to operate without the necessity of an operator, and prevents inappropriate adjustment of the cutting assembly, as might occur with an inexperienced operator.

The provision of a computerized control system 34 also allows the pelletizer system to follow certain written programs relating to steps in its operation cycle. For example, in combination with the die described in U.S. Pat. No. 6,474,969, the system can be programmed to take the following steps.

First, an operator manually advances the cutting assembly against the die face to reach a preferred contact pressure. The contact pressure may be indicated by a signal, such as a light associated with control system 34, or such as an indicator icon on a touch screen used by the operator. Then, the operator provides inputs to the control system setting a particular cutting program (relating to cutting time, material volume, etc.). The cutting assembly may then automatically be retracted back away from the die cutting face as the extruded material is extruded into and through die 14 and allowed to be purged underwater while all elements of the system are already coupled together. After a certain programmed time to allow for purging, the cutting assembly 50 is then advanced automatically by servomotor 92 and begins cutting pellets. The contact pressure is constantly monitored, and the cutting assembly is automatically advanced towards the die when the blades wear a predetermined amount (indicated by a drop in the contact pressure by a predetermined amount). This continues until the program is completed. Various other programs might be written for the system to follow.

As will be apparent to those skilled in the art in the light of the foregoing disclosure, many alterations and modifications are possible in the practice of this invention without departing from the spirit or scope thereof. For example, as shown in FIGS. 3A and 3B, this invention is not limited to cutting assemblies having any one particular configuration. Further, while the preferred system measures the load placed on servomotor 92, there are other suitable parameters (for example, linear distance moved by cutting assembly 50) which might be alternatively monitored by the system.

Accordingly, the scope of the invention is to be construed in accordance with the substance defined by the following claims.

What is claimed is:

1. In an underwater pelletizing system having an extruder extruding a polymer through an extrusion die, the die having a cutting face facing away from the extruder, a cutting system comprising:
   a) a rotatable cutting assembly bearing a plurality of cutting knives;
   b) a drive shaft attached to the cutting assembly for rotating it, the drive shaft driven by a drive motor;
   c) motorized cutting assembly adjustment means for adjustably moving the drive shaft axially toward and away from the cutting face of the die, thereby moving with it the cutting assembly along its rotational axis;
   d) a load measuring system associated with the motorized cutting assembly adjustment means to measure the contact pressure between the cutting assembly and the cutting face of the die;
   e) a control system for coordinating communication between the measuring system and the motorized cutting assembly adjustment means and for providing instructions to the motorized cutting assembly adjustment means to move the drive shaft toward or away from the cutting face of the die; and
   f) a frame, wherein said drive motor is carried on a carriage mounted on and movable relative to said frame and wherein said motorized cutting assembly adjustment means comprises a servomotor for reciprocating said carriage linearly relative said frame.

2. The pelletizing system as described in claim 1 wherein said servomotor turns a ball screw having a shaft attached to said carriage for moving said carriage.

3. The pelletizer as described in claim 2 wherein said carriage includes a plurality of ball bearings which journal one or more shafts forming a portion of said frame.

4. The pelletizer as described in claim 3, wherein the control system comprises a programmable logic control system allowing operator inputs.

5. The pelletizing system as described in claim 1 wherein said cutting assembly further comprises
   1.) a center hub fashioned to be threaded onto an end of said drive shaft;
   2.) a blade holding portion; and
   3.) an elastomeric disc attached to both said center hub and said blade holder, bridging an annular gap therebetween.

6. The pelletizing system as described in claim 1, further comprising a honing disc assembly which may be clamped to said cutting system by a quick-disconnect clamp.

7. The pelletizing system as described in claim 1, further comprising quick-disconnect clamps clamping both the extruder and the cutting system to the water chamber.

8. The pelletizing system as described in claim 2, wherein the ball screw has zero backlash.

\* \* \* \* \*